US012636915B2

(12) United States Patent
Sun

(10) Patent No.: US 12,636,915 B2
(45) Date of Patent: May 26, 2026

(54) SIDEWALL STRUCTURE OF TIRE

(71) Applicant: QINGDAO AUFINE TYRE CO., LTD., Shandong (CN)

(72) Inventor: Zongtao Sun, Qingdao (CN)

(73) Assignee: Qingdao Aufine Tyre Co., Ltd., Qingdao City (CN)

( * ) Notice: Subject to any disclaimer, the term of this patent is extended or adjusted under 35 U.S.C. 154(b) by 0 days.

(21) Appl. No.: 19/074,298

(22) Filed: Mar. 7, 2025

(65) Prior Publication Data

US 2026/0042322 A1      Feb. 12, 2026

(30) Foreign Application Priority Data

Aug. 7, 2024   (CN) ......................... 202421894948.1
Dec. 30, 2024   (CN) ......................... 202423268473.8

(51) Int. Cl.
B60C 13/00          (2006.01)
(52) U.S. Cl.
CPC .................................. B60C 13/001 (2013.01)
(58) Field of Classification Search
CPC ....... B60C 13/001; B60C 13/00; B60C 13/02; B60D 12/605
See application file for complete search history.

(56) References Cited

U.S. PATENT DOCUMENTS

D999,720 S  *   9/2023  Ishii ............................. D12/605
2002/0174928 A1*  11/2002  Ratliff, Jr. ............. B60C 13/001
                                                              152/555
2012/0273101 A1*  11/2012  Iwabuchi .................. B60C 5/00
                                                              152/151
2017/0246917 A1*   8/2017  Iwabuchi .............. B60C 13/002
2020/0070591 A1*   3/2020  Debordeaux ......... B60C 13/001
2020/0130422 A1*   4/2020  Kuwahara ............. B60C 13/001

FOREIGN PATENT DOCUMENTS

EP            2842766 A1  *   3/2015   ........... B60C 13/001
WO     WO-2017102129 A1  *   6/2017   ........... B60C 13/001

* cited by examiner

*Primary Examiner* — Robert C Dye
(74) *Attorney, Agent, or Firm* — Bay State IP, LLC

(57) ABSTRACT

Provided is a sidewall structure of a tire, belonging to the technical field of sidewall structures. The sidewall structure of the tire includes a tire, a side surface of the tire is designed with multiple knurling lines which are formed on a sidewall of the tire by a knurling engraving process. The knurling lines are composed of sparse knurling lines and dense knurling lines which are alternately arranged on the sidewall of the tire. The knurling lines are composed of radial protrusions distributed in an array, and the knurling lines and the tire are integrally formed. The sparse knurling lines and the dense knurling lines are composed of a plurality of knurling lines which are arranged in parallel to form non-closed polygonal patterns, respectively, and the sparse knurling lines and the dense knurling lines are connected and combined to form a new polygonal pattern on the sidewall of the tire.

4 Claims, 8 Drawing Sheets

20

10

20

10

SIDEWALL STRUCTURE OF TIRE

CROSS REFERENCE TO RELATED APPLICATION

This application claims the benefit of and takes priority from Chinese Patent Application Serial No. 202421894948.1 filed on Aug. 7, 2024, and also takes priority from Chinese Patent Application Serial No. 202423268473.8 filed on Dec. 30, 2024 the contents of which are herein incorporated by reference.

TECHNICAL FIELD

The present disclosure belongs to the technical field of sidewall structures, and in particular to a sidewall structure of a tire.

BACKGROUND

Tire is a key component of vehicle for making contact with the ground, a sidewall part of which plays a vital role. The tire not only undertakes the basic functions of transferring driving force and braking force as well as supporting vehicle body, but also plays a vital role in vehicle handling stability, comfort and safety. The tire is mainly composed of a tread, a sidewall, a ply, and other parts, in which the sidewall is located on the side surface of the tire for connecting the inner ring and the outer ring of the tire, thus playing a role of protecting the internal structure of the tire and transmitting information. The sidewall of the tire is generally used to display the specification, model, production date, manufacturer information and various safety warning signs of the tire. In addition, the aesthetic appearance of the sidewall is also an important factor for consumers to consider when buying tires. With the increasingly fierce market competition, the consumers pay more and more attention to the appearance design of the tire, not only is it required that the tire have excellent performance, but there is also an expectation that the tire can provide visual aesthetic pleasure. Therefore, the tire manufacturers are constantly exploring how to improve the attractiveness of products by improving the sidewall design of the tires while ensuring the performance of the tires.

The traditional sidewall design of the tire is relatively simple, which mostly utilizes simple straight or wavy lines as the knurling line types, leading to the lack of sufficient creativity and visual impact. Such a design is not only difficult to attract the attention of consumers, but also lacks competitiveness in the market. Especially in the truck tire market, due to the large size of the truck tire and relatively large area of the sidewall, it is easy to give people a monotonous feeling if the design is improper. In addition, the truck tire is usually used for long-distance transportation, the complex driving environment makes the tire wear faster, and thus there are higher requirements for the durability and aesthetic appearance of the tire. However, the existing sidewall design of the tire often cannot meet these requirements, which leads to the serious homogeneity of tire products in the market and the lack of differentiated competitive advantage.

SUMMARY

In view of this, the present disclosure provides a sidewall structure of a tire, which solves the disadvantages of monotonous sidewall design and single knurling line type of the traditional tire are solved.

The present disclosure is implemented as follows:

the present disclosure provides a sidewall structure of a tire, including a tire. A side surface of the tire is designed with multiple knurling lines which are formed on a sidewall of the tire by a knurling engraving process; the knurling lines are composed of sparse knurling lines and dense knurling lines which are alternately arranged on the sidewall of the tire. The knurling lines are composed of radial protrusions distributed in an array, and the knurling lines and the tire are integrally formed.

The sparse knurling lines are arranged radially in an X-shape, while the dense knurling lines are arranged in horizontal or vertical lines to form a diamond pattern.

A radial structure of a sidewall of a tire provided by the present disclosure has the following technical effects: by adjusting the density of the knurling lines on the sidewall, angles of the knurling lines as well as processing angles, a three-dimensional pattern can be formed under the light to generate different three-dimensional visual effects, thus improving the aesthetic appearance of the sidewall of the tire as well as the value of the tire. Due to different density and angles of the knurling lines, the knurling line types will show three-dimensional effects under the light, and the sidewall will show different changes when viewing from different angles.

On the basis of the above technical solution, a sidewall structure of the tire provided by the present disclosure may have the following improvements:

the sparse knurling lines are composed of multiple knurling lines which are arranged in parallel to form a non-closed polygonal pattern.

The above improvement solution has the beneficial effects as follows: a polygon pattern formed by the dense knurling lines is defined as a closed geometric polygon. Such a design enables stress to be more evenly distributed on all edges and vertices of the polygon when the tire is stressed, thus effectively improving the overall structural strength of the tire.

Further, the dense knurling lines are composed of multiple knurling lines which are arranged in parallel to form a non-closed polygonal pattern.

Further, the sparse knurling lines and the dense knurling lines are connected and combined to form a new polygonal pattern on the sidewall of the tire.

Further, a design angle of each of the sparse knurling line and the dense knurling line ranges from 0° to 90°, and the design angle is specifically an angle between the knurling line and the sidewall of the tire.

Further, a spacing between the sparse knurling lines ranges from 0.6 mm to 1.2 mm, and a spacing between the dense knurling lines ranges from 0.5 mm to 0.8 mm.

Further, an angle of the knurling line relative to a radius line of the tire ranges from 0° to 90°.

Further, an angle of each of both sides of the knurling line relative to a sidewall surface of the tire ranges from 30° to 60°.

Further, a depth of the knurling line relative to the sidewall surface of the tire ranges from 0.2 mm to 1.2 mm.

Further, the tire and the knurling line are both made of rubber.

Compared with the prior art, a radial structure of a sidewall of a tire provided by the present disclosure has beneficial effects as follows.

Aesthetic appearance improvement: by adjusting the density and angles of the knurling lines, rich three-dimensional effects can be presented under different light irradiation, which makes the sidewall of the tire more vivid and interesting visually, thus greatly improving the overall aesthetic appearance of the tire.

Market competitiveness enhancement: compared with the traditional single knurling line type, the sidewall design of the tire in the present disclosure is more novel and unique, which can attract the attention of consumers and enhance the market competitiveness of products.

Commercial value increase: as one of the important parts of a vehicle, the aesthetic appearance of the tire directly affects purchase decision of the consumer. The design of the present disclosure not only can improve the attractiveness of the tire itself, but also can bring higher sales profits to the manufacturer.

Diversified needs adaption: the design of the present disclosure can be customized according to different application scenarios and customer needs to meet the individual needs of different markets.

User experience improvement: the aesthetic appearance of the tire is related to both the overall appearance of the vehicle and the psychological feeling of the driver. The driving experience and the degree of satisfaction of the user can be improved by improving the appearance design of the tire.

BRIEF DESCRIPTION OF THE DRAWINGS

To describe the technical solutions of the present disclosure or in the prior art more clearly, the following briefly introduces the accompanying drawings required for describing the embodiments or the prior art. Apparently, the accompanying drawings in the following description show merely some embodiments of the present disclosure, and those of ordinary skill in the art may still derive other drawings from these accompanying drawings without creative efforts.

Figure 1:
FIG. 1 is a diagram of a first embodiment of a sidewall structure of a tire.

In the drawings, a list of components represented by various reference numerals is as follows:

10—tire; 20—knurling line; 21—sparse knurling line; 22—dense knurling line.

DETAILED DESCRIPTION OF THE EMBODIMENTS

To make the objectives, technical solutions and advantages of the present disclosure more clearly, the following clearly and completely describes the technical solutions in the embodiments of the present disclosure with reference to the accompanying drawings in the embodiments of the present disclosure.

Figure 2:
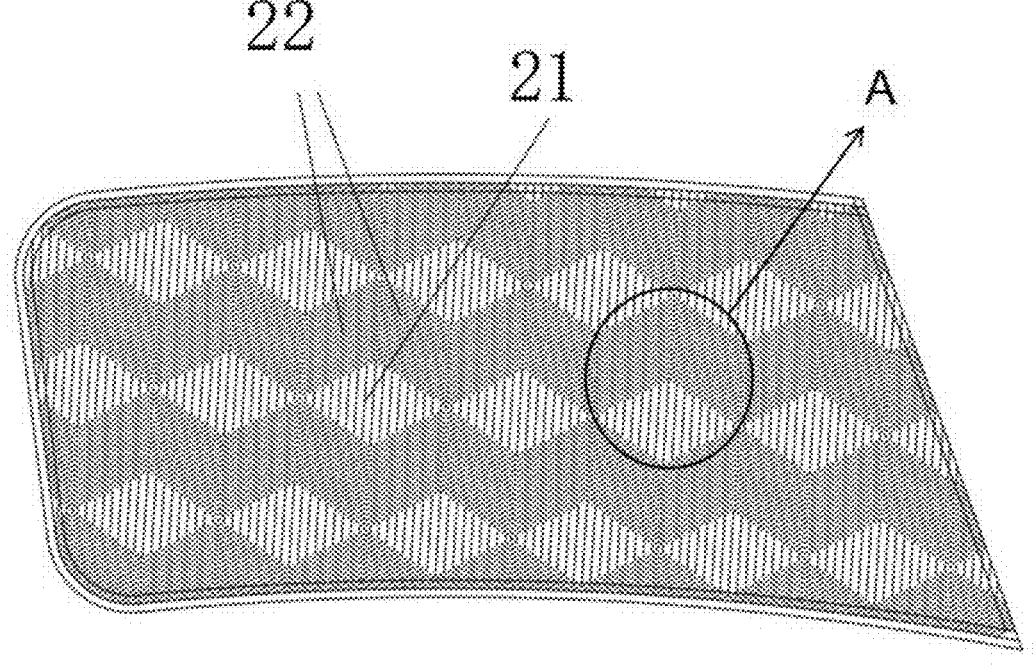
FIG. 2 is an example diagram of a knurling line in a first embodiment of a sidewall structure of a tire.

As shown in FIG. 1 and FIG. 2, a first embodiment of a sidewall structure of a tire is provided by the present disclosure. In this embodiment, the sidewall structure includes a tire 10, and a side surface of the tire 10 is designed with a plurality of knurling lines 20 which are formed on a sidewall of the tire 10 by a knurling engraving process. The knurling lines 20 are composed of sparse knurling lines 21 and dense knurling lines 22 which are alternately arranged on the sidewall of the tire 10. The knurling lines 20 are composed of radial protrusions distributed in an array, and the knurling lines 20 and the tire 10 are integrally formed.

The sparse knurling lines 21 are arranged radially in an X-shape, while the dense knurling lines 22 are arranged in horizontal or vertical lines to form a diamond pattern.

In above technical solution, the sparse knurling lines 21 are composed of multiple knurling lines 20 which are arranged in parallel to form a non-closed diamond pattern.

Further, in above technical solution, the dense knurling lines 22 are composed of multiple knurling lines 20 which are arranged in parallel to form a non-closed irregular hexagonal pattern. The irregular hexagon has six sides with equal length, which is similar to the splicing of two diamond patterns.

Figure 3:
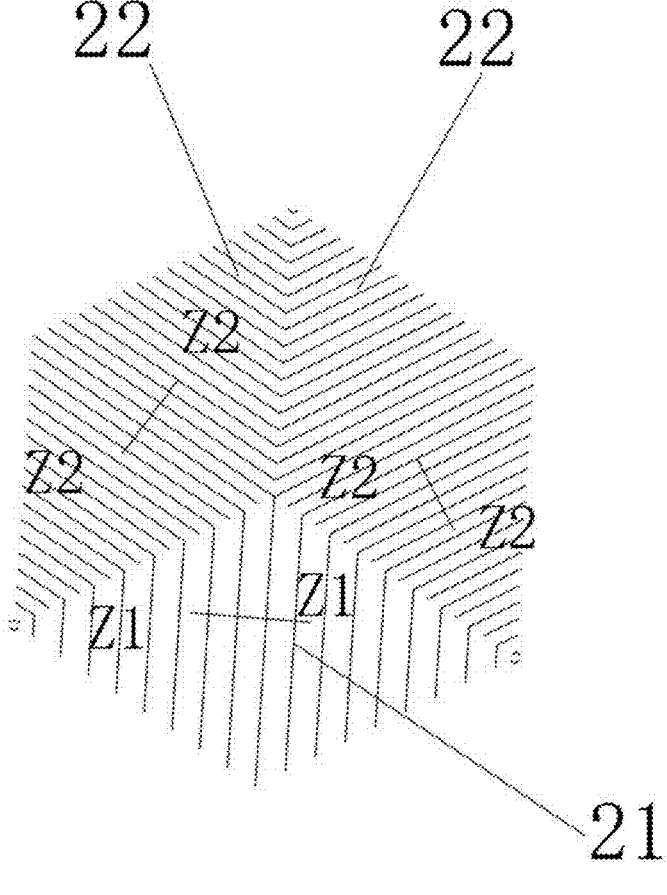
FIG. 3 is an enlarged view of part A in FIG. 2.

As shown in FIG. 3, further, in the above technical solution, the sparse knurling lines 21 and the dense knurling lines 22 are connected and combined to form a regular hexagonal pattern on the sidewall of the tire 10. The shape of the sparse knurling line is in fit with a bottom recess of the dense knurling line, and the sparse knurling line and the dense knurling line have the same side length and can form a regular hexagon. Z1-Z1 position is the sparse knurling line, and Z2-Z2 position is the dense knurling line.

Further, in the above technical solution, a design angle of each of the sparse knurling line 21 and the dense knurling line 22 ranges from 0° to 90°, and the design angle is specifically an angle between the knurling line 20 and the sidewall of the tire 10.

Further, in the above technical solution, a spacing between the sparse knurling lines 21 ranges from 0.6 mm to 1.2 mm, and a spacing between the dense knurling lines 22 ranges from 0.5 mm to 0.8 mm.

Further, in the above technical solution, an angle of the knurling line 20 relative to a radius line of the tire 10 ranges from 0 to 90°.

Further, in the above technical solution, an angle of each of both sides of the knurling line 20 relative to a sidewall surface of the tire 10 ranges from 30° to 60°.

Further, in the above technical solution, a depth of the knurling line 20 relative to the sidewall surface of the tire 10 ranges from 0.2 mm to 1.2 mm.

Further, in the above technical solution, the tire 10 and the knurling line 20 are both made of rubber.

Figure 4:
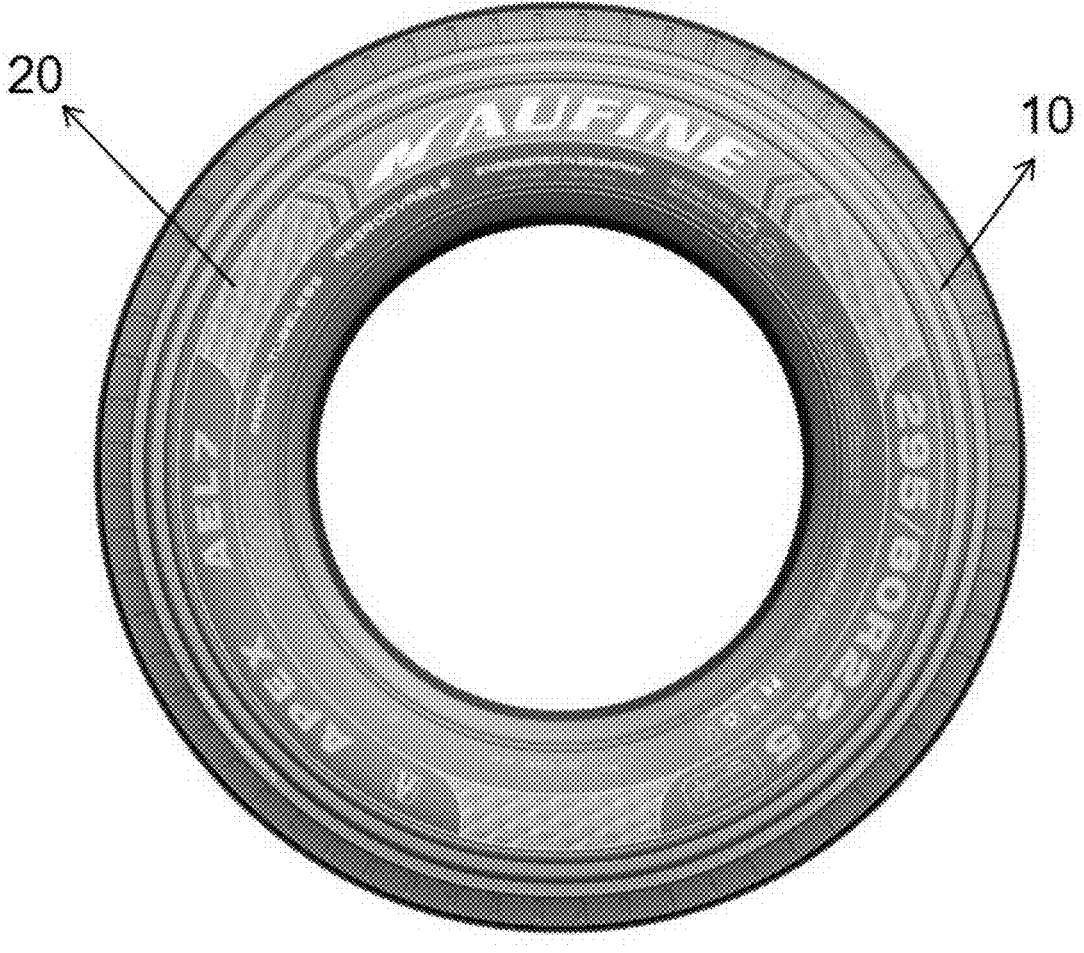
FIG. 4 is a diagram of a second embodiment of a sidewall structure of a tire.
Figure 5:
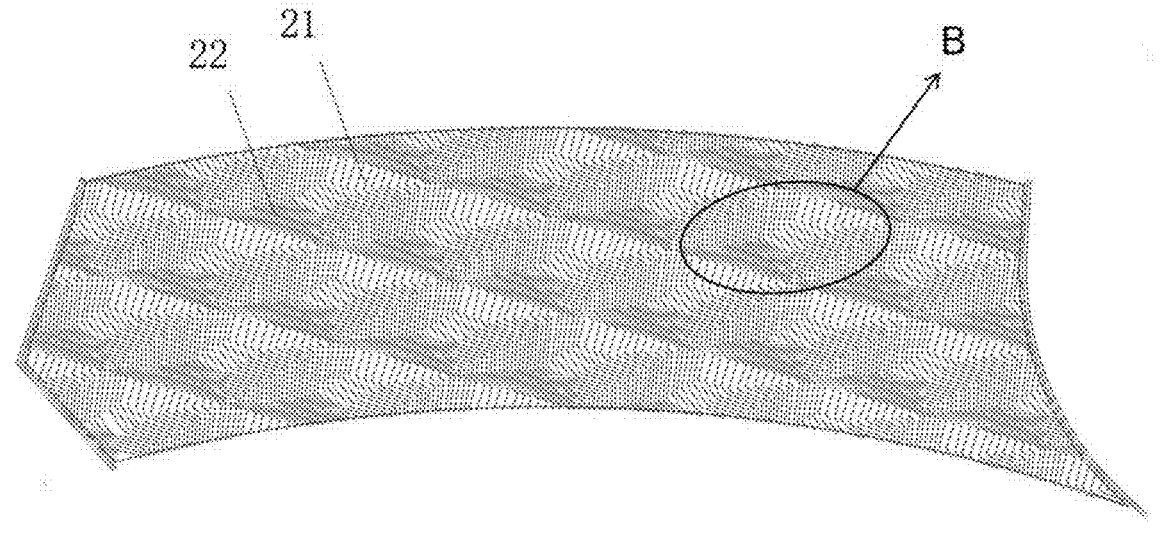
FIG. 5 is an example diagram of a knurling line in a second embodiment of a sidewall structure of a tire.

As shown in FIG. 4 and FIG. 5, a second embodiment of a sidewall structure of a tire is provided by the present disclosure. In this embodiment, the sidewall structure includes a tire 10, and a side surface of the tire 10 is designed with a plurality of knurling lines 20 which are formed on a sidewall of the tire 10 by a knurling engraving process. The knurling lines 20 are composed of sparse knurling lines 21 and dense knurling lines 22 which are alternately arranged on the sidewall of the tire 10. The knurling lines 20 are composed of radial protrusions distributed in an array, and the knurling lines 20 and the tire 10 are integrally formed.

Figure 6:
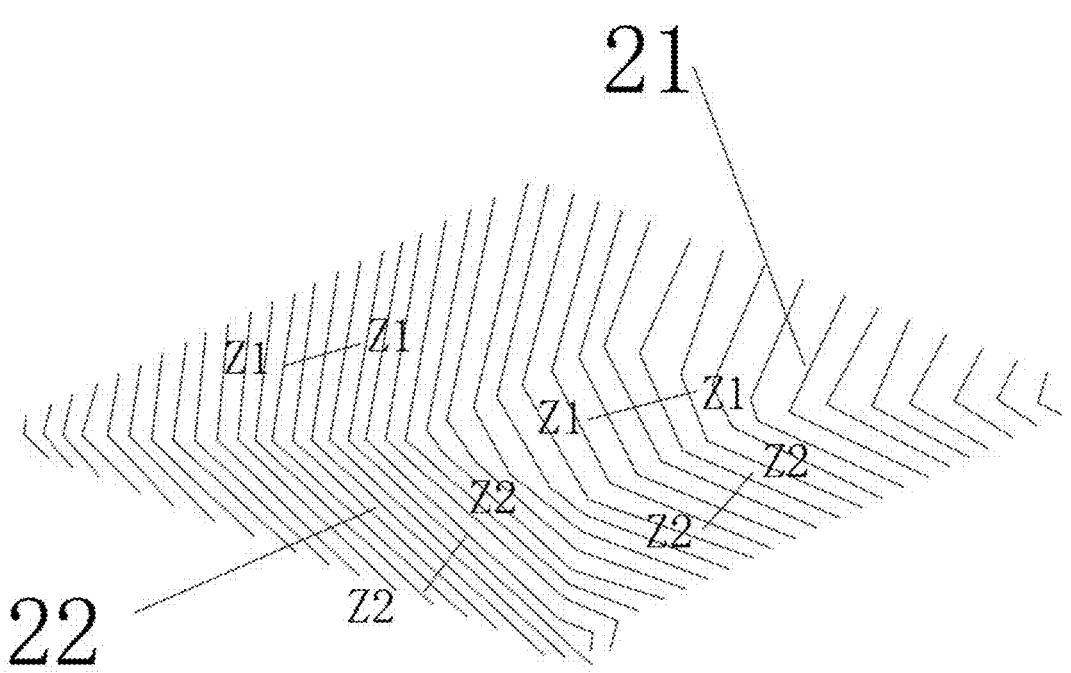
FIG. 6 is an enlarged view of part B in FIG. 5.

As shown in FIG. 6, further, in the above technical solution, the sparse knurling lines 21 and the dense knurling lines 22 are connected and combined to form a diamond pattern on the sidewall of the tire 10. Z1-Z1 position is the sparse knurling line, and Z2-Z2 position is the dense knurling line.

Further, in the above technical solution, a design angle of each of the sparse knurling line 21 and the dense knurling line 22 is 90°, and the design angle is specifically an angle between the knurling line 20 and the sidewall of the tire 10.

Further, in the above technical solution, a spacing between the sparse knurling lines 21 ranges from 0.6 mm to 1.2 mm, and a spacing between the dense knurling lines 22 ranges from 0.5 mm to 0.8 mm.

Further, in the above technical solution, an angle of the knurling line 20 relative to a radius line of the tire 10 ranges from 0 to 90°.

Further, in the above technical solution, an angle of each of both sides of the knurling line 20 relative to a sidewall surface of the tire 10 ranges from 30° to 60°.

Further, in the above technical solution, a depth of the knurling line 20 relative to the sidewall surface of the tire 10 ranges from 0.2 mm to 1.2 mm.

Further, in the above technical solution, the tire 10 and the knurling line 20 are both made of rubber.

Figure 7:
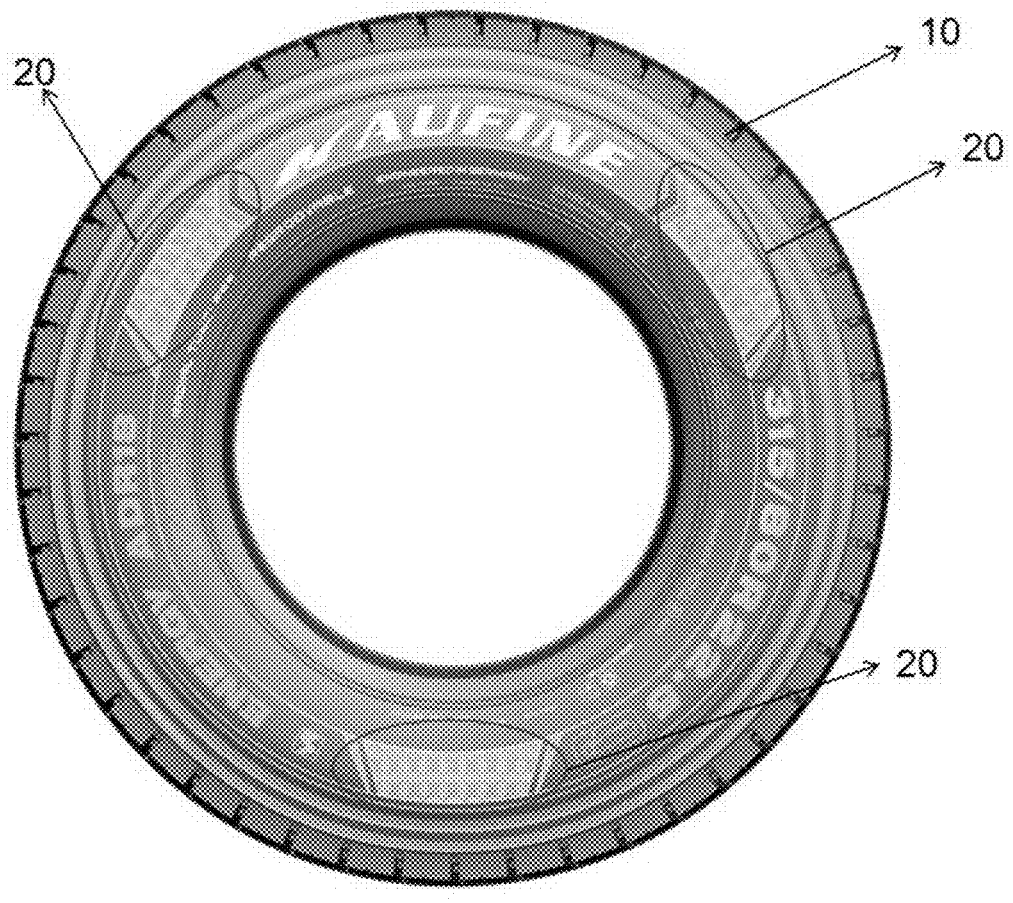
FIG. 7 is a diagram of a third embodiment of a sidewall structure of a tire.
Figure 8:
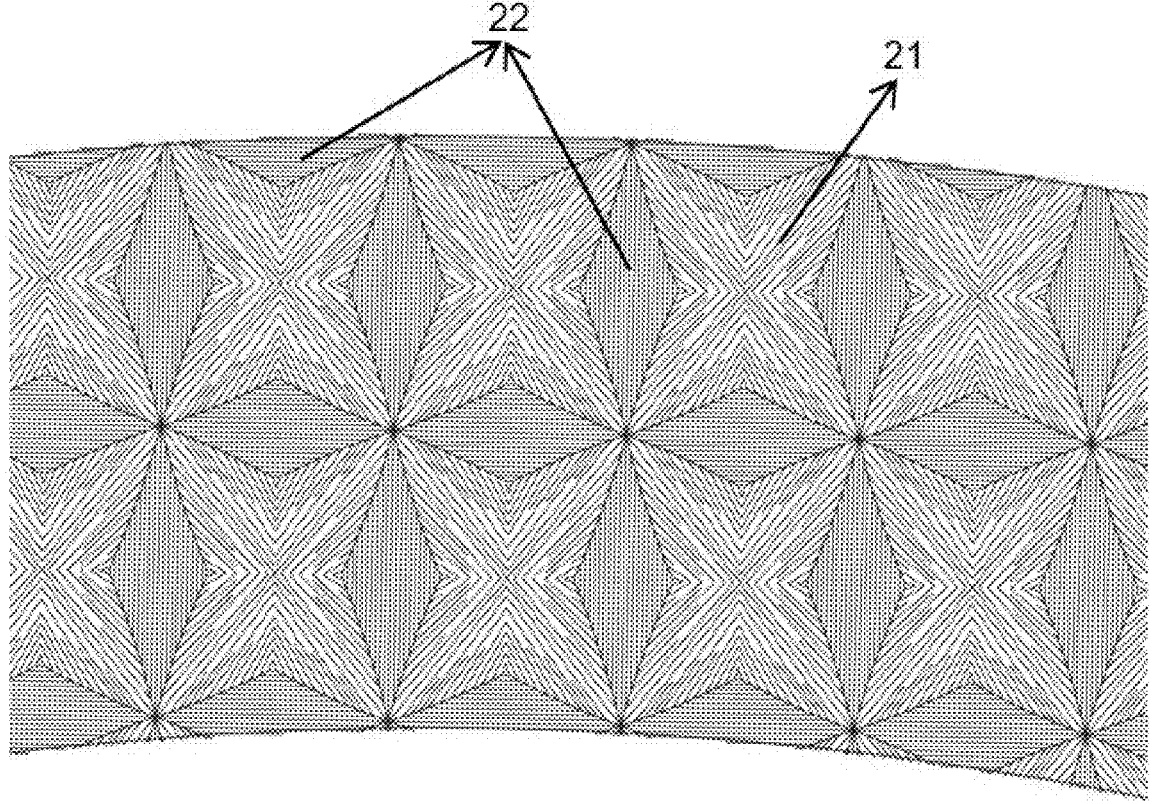
FIG. 8 is an example diagram of a knurling line in a third embodiment of a sidewall structure of a tire.

As shown in FIG. 7 and FIG. 8, a third embodiment of a sidewall structure of a tire is provided by the present disclosure. In this embodiment, the sidewall structure includes a tire 10, and a side surface of the tire 10 is designed with a plurality of knurling lines 20 which are formed on a sidewall of the tire 10 by a knurling engraving process. The knurling lines 20 are composed of sparse knurling lines 21 and dense knurling lines 22 which are alternately arranged on the sidewall of the tire 10. The knurling lines 20 are composed of radial protrusions distributed in an array, and the knurling lines 20 and the tire 10 are integrally formed.

The sparse knurling lines 21 are arranged radially in an X-shape, while the dense knurling lines 22 are arranged in horizontal or vertical lines to form a diamond pattern.

Figure 9:
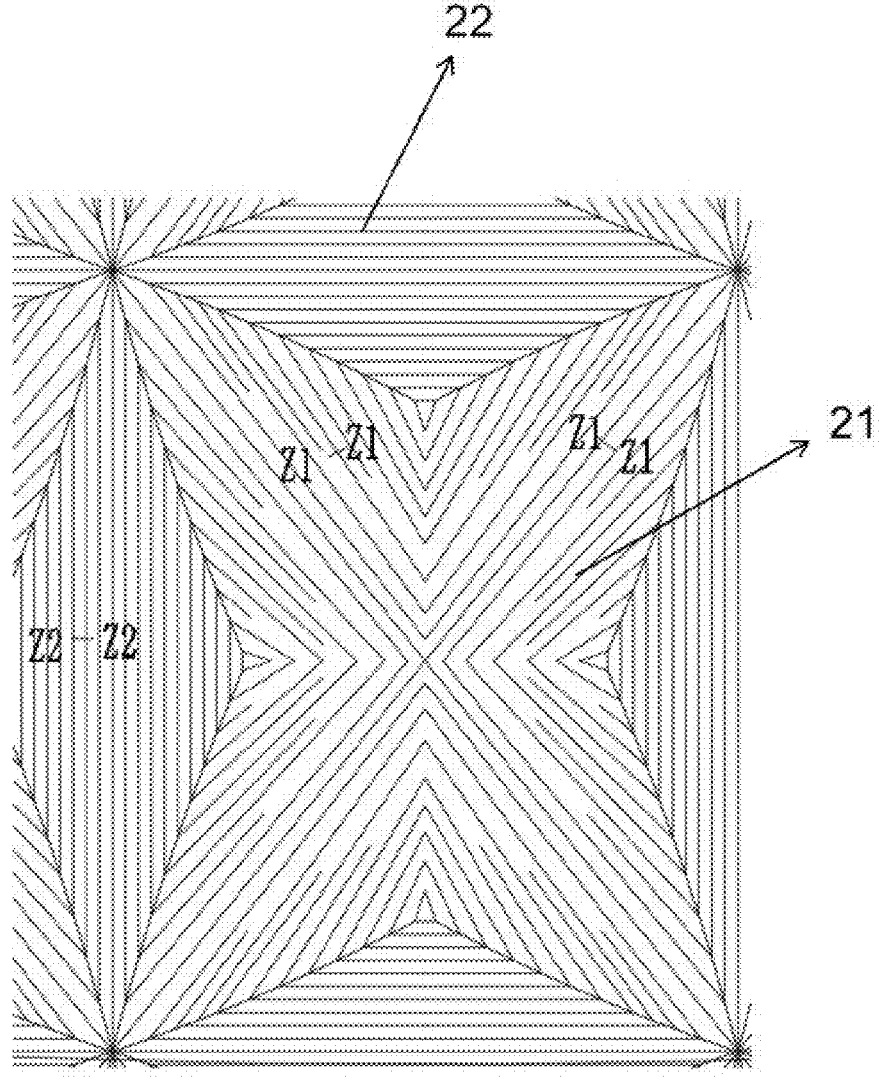
FIG. 9 is an enlarged view of part B in FIG. 8.

As shown in FIG. 9, in the above technical solution, the dense knurling lines 22 are respectively arranged around the top, bottom, left and right of the sparse knurling lines 21.

Further, in the above technical solution, the dense knurling lines 22 arranged at upper and lower parts of the sparse knurling lines 21 are arranged in horizontal lines, and the dense knurling lines 22 arranged at left and right parts of the sparse knurling lines 21 are arranged in vertical lines.

Further, in the above technical solution, a spacing between the sparse knurling lines 21 ranges from 0.6 mm to 1.2 mm, and a spacing between the dense knurling lines 22 ranges from 0.5 mm to 0.8 mm.

Further, in the above technical solution, an angle of the knurling line 20 relative to a radius line of the tire 10 ranges from 0 to 90°.

Further, in the above technical solution, an angle of each of both sides of the knurling line 20 relative to a sidewall surface of the tire 10 ranges from 30° to 60°.

Further, in the above technical solution, a depth of the knurling line 20 relative to the sidewall surface of the tire 10 ranges from 0.2 mm to 1.2 mm.

Further, in the above technical solution, the tire 10 and knurling line 20 are made of rubber.

The technical solution is described as follows:

the spacing between the sparse knurling lines is 0.8 mm, and the spacing between the dense knurling lines is 0.5 mm. The design angle of the knurling line is 40°, a processing angle of the knurling line is 40°, and a processing depth of the knurling line is 0.3 mm.

The specific implementation process is as follows:

Design stage: in the design stage, a three-dimensional model of the sidewall of the tire is created by computer aided design (CAD) software, and the position, spacing and angle of the sparse knurling lines are planned on this model.

Mold manufacturing: a tire mold is manufactured according to a design drawing to ensure that the knurling lines on the mold meet the design requirements.

Molding process: the tire is molded by the mold, it is ensured that the processing angle of the knurling line is 40° and the processing depth is 0.3 mm.

Inspection and testing: after the tire is molded, the appearance inspection and performance test are carried out to ensure the clarity of the knurling line and the overall performance of the tire.

Specifically, the principle of the present disclosure is as follows:

Density adjustment of knurling line: a combination of the sparse knurling lines and the dense knurling lines is adopted, and different visual effects can be achieved by adjusting the spacing between the two knurling lines. Such a sparse-dense combined design can produce rich light and shadow changes under different light, which makes the sidewall of the tire present a more three-dimensional effect.

Design angle of knurling line: the design angle of the knurling line refers to the angle of the knurling line relative to the sidewall or a tire circumferential direction of the tire determined in the design stage. The design angle of each of the sparse knurling lines and the dense knurling lines in the present disclosure ranges from 0° to 90°, which is helpful to form a specific visual effect on the sidewall of the tire, making the tire show different three-dimensional effects at different angles.

Processing angle of knurling line: the processing angle refers to the angle of a knurling tool relative to the sidewall or the tire circumferential direction of the tire during the processing. By accurately controlling the processing angle, it can ensure that the knurling lines form a clear and consistent three-dimensional effect on the sidewall of the tire.

Combination of knurling line design: in the present disclosure, the sparse knurling lines and the dense knurling lines are combined according to a specific pattern to form a unique visual effect. Such a combination not only enriches the appearance design of the sidewall of the tire, which makes the tire show different three-dimensional effects under different light irradiations.

What is claimed is:

1. A sidewall structure of a tire, comprising a tire (10), wherein a side surface of the tire (10) is designed with a plurality of knurling lines (20) which are formed on a sidewall of the tire (10) by a knurling engraving process; the knurling lines (20) are composed of sparse knurling lines (21) and dense knurling lines (22) which are alternately arranged on the sidewall of the tire (10); the knurling lines (20) are composed of protrusions distributed in an array, and the knurling lines (20) and the tire (10) are integrally molded;

wherein the sparse knurling lines (21) are arranged radially in an X-shape, while the dense knurling lines (22) are arranged in horizontal or vertical lines to form a diamond pattern;

wherein the sparse knurling lines (21) are composed of a plurality of knurling lines which are arranged in parallel to form a polygonal pattern;

wherein the dense knurling lines (22) are composed of a plurality of knurling lines (20) which are arranged in parallel to form a polygonal pattern;

wherein the sparse knurling lines (21) and the dense knurling lines (22) are connected and combined to form a new polygonal pattern on the sidewall of the tire (10); and wherein a spacing between the sparse knurling lines (21) ranges from 0.6 mm to 1.2 mm, and a spacing between the dense knurling lines (22) ranges from 0.5 mm to 0.8 mm.

2. The sidewall structure of a tire according to claim 1, wherein an angle of each of both sides of the knurling lines (20) relative to a sidewall surface of the tire (10) ranges from 30° to 60°.

3. The sidewall structure of a tire according to claim 2, wherein a depth of the protrusions of the knurling lines (20) relative to the sidewall surface of the tire (10) ranges from 0.2 mm to 1.2 mm.

4. The sidewall structure of a tire according to claim 3, wherein the tire (10) and the knurling lines (20) are both made of rubber.

* * * * *